US011389995B2

(12) United States Patent
Lee et al.

(10) Patent No.: US 11,389,995 B2
(45) Date of Patent: Jul. 19, 2022

(54) INJECTION MOLDING METHOD FOR A SEMIFINISHED PRODUCT

(71) Applicant: CONCRAFT HOLDING CO., LTD., Grand Cayman (KY)

(72) Inventors: Kuo-Chi Lee, New Taipei (TW); Chin-Hsing Lee, New Taipei (TW); Lei Cheng, Kunshan (CN)

(73) Assignee: DRAGONSTATE TECHNOLOGY CO., LTD., New Taipei (TW)

( * ) Notice: Subject to any disclaimer, the term of this patent is extended or adjusted under 35 U.S.C. 154(b) by 305 days.

(21) Appl. No.: 16/842,125

(22) Filed: Apr. 7, 2020

(65) Prior Publication Data

US 2021/0245410 A1 Aug. 12, 2021

(30) Foreign Application Priority Data

Feb. 11, 2020 (TW) ................. 109104189

(51) Int. Cl.
*B29C 45/14* (2006.01)
*B29C 45/00* (2006.01)
*B29C 45/64* (2006.01)
*B29C 45/40* (2006.01)
*B29C 45/27* (2006.01)

(52) U.S. Cl.
CPC .... *B29C 45/14262* (2013.01); *B29C 45/0001* (2013.01); *B29C 45/27* (2013.01); *B29C 45/40* (2013.01); *B29C 45/641* (2013.01)

(58) Field of Classification Search
CPC ............ B29C 45/1705; B29C 45/1742; B29C 45/1775; B29C 45/1786; B29C 45/1791
See application file for complete search history.

(56) References Cited

U.S. PATENT DOCUMENTS

2017/0036638 A1* 2/2017 Cowelchuk ......... B29C 45/0081
2019/0210259 A1* 7/2019 Hattori ................ B29C 45/1742

FOREIGN PATENT DOCUMENTS

JP 05015120 A * 1/1993
JP 10156865 A * 6/1998 ......... B29C 45/1418

* cited by examiner

*Primary Examiner* — Joseph S Del Sole
*Assistant Examiner* — Thu Khanh T Nguyen
(74) *Attorney, Agent, or Firm* — Muncy, Geissler, Olds & Lowe, P.C.

(57) ABSTRACT

An injection molding method for a semifinished product includes a semifinished product emplacement step, a semifinished product pre-compression step and a forming step. First, a pair of mold with a forming space is provided. A semifinished product is put into the mold, and a first joint is performed to the mold by a press-fit jig, fixing the semifinished product in the forming space. The semifinished product is also tightly fitted with the mold. Next, a first open-die is performed and the press-fit jig is removed. After that, a second joint is performed, and a forming material is injected into the forming space. Finally, a second open-die is performed, and then a finished product is formed. By the semifinished product pre-compression step, the forming material can be prevented from resulting in spill or burr on the semifinished product, thereby improving the yield of injection molding.

10 Claims, 9 Drawing Sheets

INJECTION MOLDING METHOD FOR A SEMIFINISHED PRODUCT

BACKGROUND OF THE INVENTION a) Field of the Invention

The present invention relates to an injection molding method, and more particularly to an injection molding method for a semifinished product, which is able to prevent spill or burr on the semifinished product to improve the yield of finished product.

b) Description of the Prior Art

In injection molding, a forming space is formed primarily in a pair of mold, and a forming material is injected into the forming space to form a finished product after cooling. The existing forming materials that are used in the injection molding include generally plastic, composite powder of metal and plastic, and silica-gel.

The forming material is first heated up to become liquid, and then the liquid forming material is injected under high pressure into the mold after passing through an injection machine, and is formed into a finished product after cooling and turning into solid. When the forming materials are in the liquid state, the fluidity of silica-gel is larger than that of plastic, whereas the fluidity of plastic is larger than that of metal-plastic composite powder.

In particular, silica-gel is provided with the excellent fluidity. Therefore, when silica-gel is used as the forming material, spill or burr can be easily formed on a joint location of the mold after forming the finished product, due to insufficient joint force from the mold. Accordingly, after injection molding, a large amount of manpower or material will be needed to trim the spill or burr on the finished product. This will decrease the yield of injection molding and also spend a great deal of labor cost to increase the production cost significantly.

Accordingly, how to provide an injection molding method that the spill or burr can be decreased considerably during injection molding is an issue to be solved by the present invention.

SUMMARY OF THE INVENTION

The primary object of the present invention is to provide an injection molding method, and more particularly to an injection molding method for a semifinished product, which is able to prevent spill or burr on the semifinished product to improve the yield of finished product.

To achieve the abovementioned object, the present invention discloses an injection forming method for a semifinished product. The injection forming method includes a semifinished product emplacement step, a semifinished product pre-compression step and a forming step. In the semifinished product emplacement step, a pair of mold is first provided. The mold includes a first mold base and a second mold base. A forming space is formed between the first mold base and the second mold base, and a semifinished product is put into the first mold base. In the semifinished product pre-compression step, a press-fit jig is provided. The press-fit jig is emplaced between the first mold base and the second mold base, and a first joint is performed to the first mold base and the second mold base, resulting in pre-joint force between the first mold base and the second mold base. The press-fit jig presses the semifinished product into the first mold base by the pre-joint force, allowing the semifinished product to be tightly fitted with a loading member. Finally, in the forming step, a first open-die is performed, which separates the first mold base from the second mold base. Next, the press-fit jig is removed, and a second joint is performed to the first mold base and the second mold base. After that, a forming material is injected into the forming space, allowing the forming material to enclose the semifinished product in the forming space. After the forming material is cooled down and formed in the forming space, a finished product can be formed. Then, a second open-die is performed and the finished product is removed.

In an embodiment, the mold includes further a middle plate which is disposed between the first mold base and the second mold base. Upon performing a first joint, the press-fit jig is disposed between the first mold base and the middle plate.

In an embodiment, an interior of the first mold base is further formed with a loading member, and the semifinished product is sheathed outside the loading member and is tightly fitted with the loading member.

In an embodiment, the loading member is provided with a top surface and a side wall which surrounds the top surface and is interconnected with the first mold base. In addition, the side wall is protruded at least with a latching bump which is latched with the semifinished product.

In an embodiment, an interior of the semifinished product is provided with a sheathing space, allowing the semifinished product to be carried on the loading member through the sheathing space. In addition, a wall of the sheathing space is attached with the top surface and the side wall of the loading member and is tightly fitted with the loading member.

In an embodiment, a latching groove is disposed in the sheathing space at a location corresponding to the latching bump, and is latched with the latching bump.

In an embodiment, an interior of the second mold base is further provided with an abutting member which is pressed on an outer surface of the semifinished product.

In an embodiment, an interior of the first mold base is further provided with an ejection mechanism which is disposed in the loading member, so that the finished product can be ejected out of the first mold base by the ejection mechanism.

In an embodiment, an interior of the second mold base is further provided with a flow channel for the flowing of forming material. The flow channel is interconnected with the forming space, allowing the forming material to enter into the forming space through the flow channel.

In an embodiment, the semifinished product is made of plastic, and the forming material is made of silica-gel.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
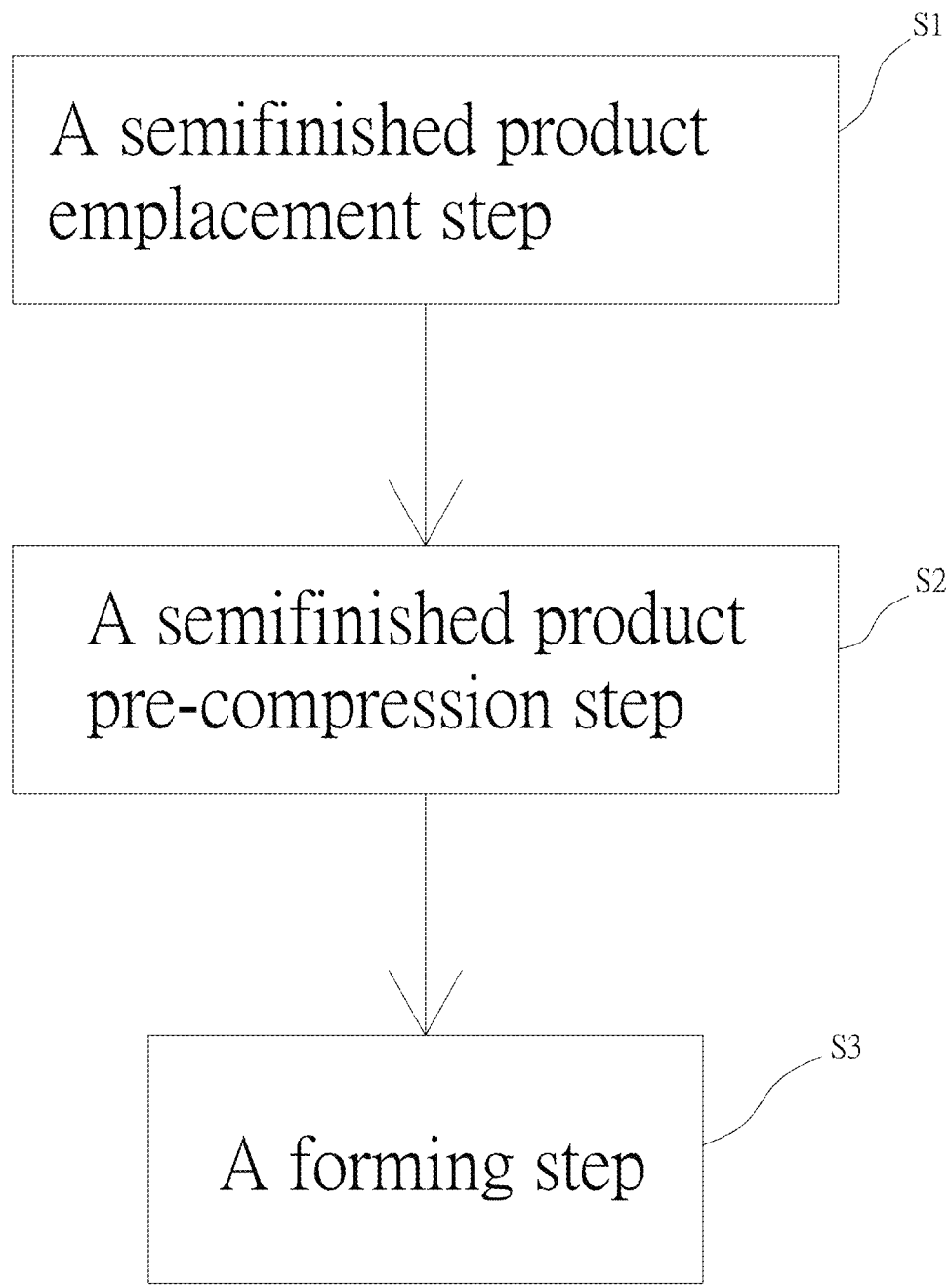
FIG. 1 shows a flow diagram of steps of the present invention.
Figure 2:
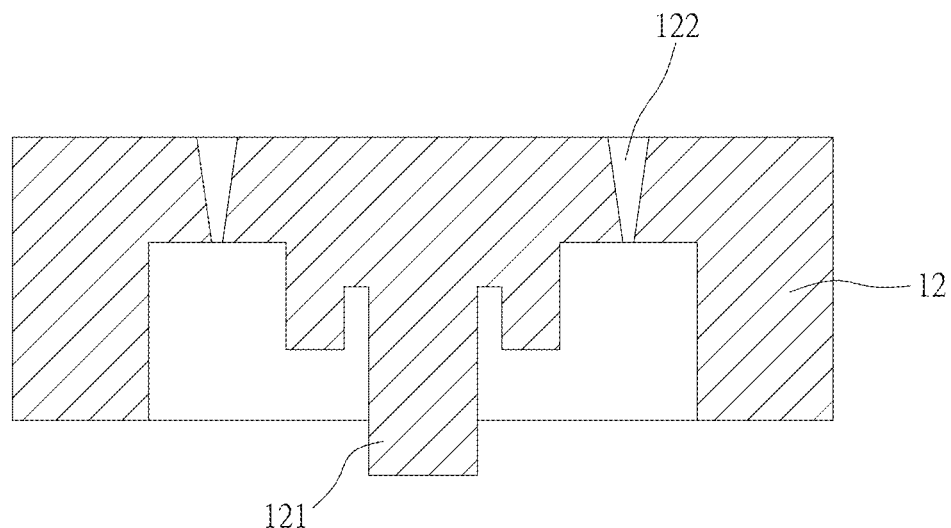
FIG. 2 shows a cutaway view wherein a semifinished product is put into a mold, according to the present invention.
Figure 2:
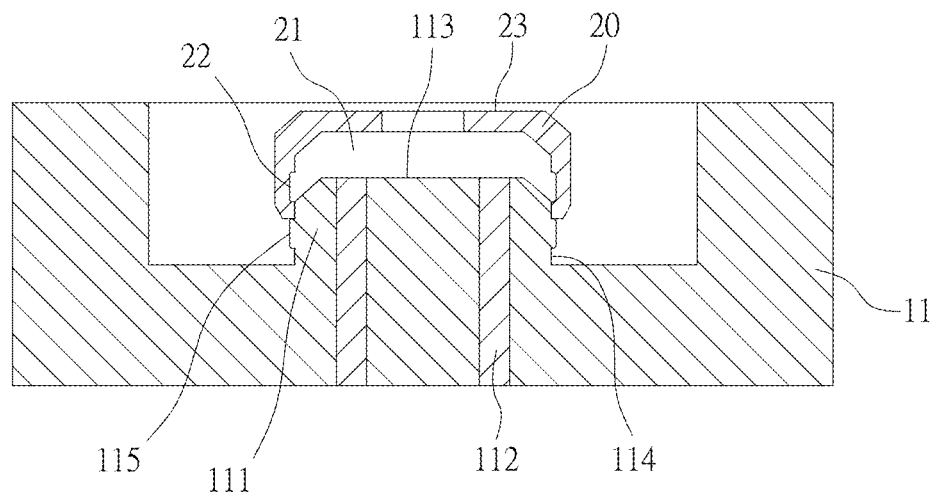
Figure 3:
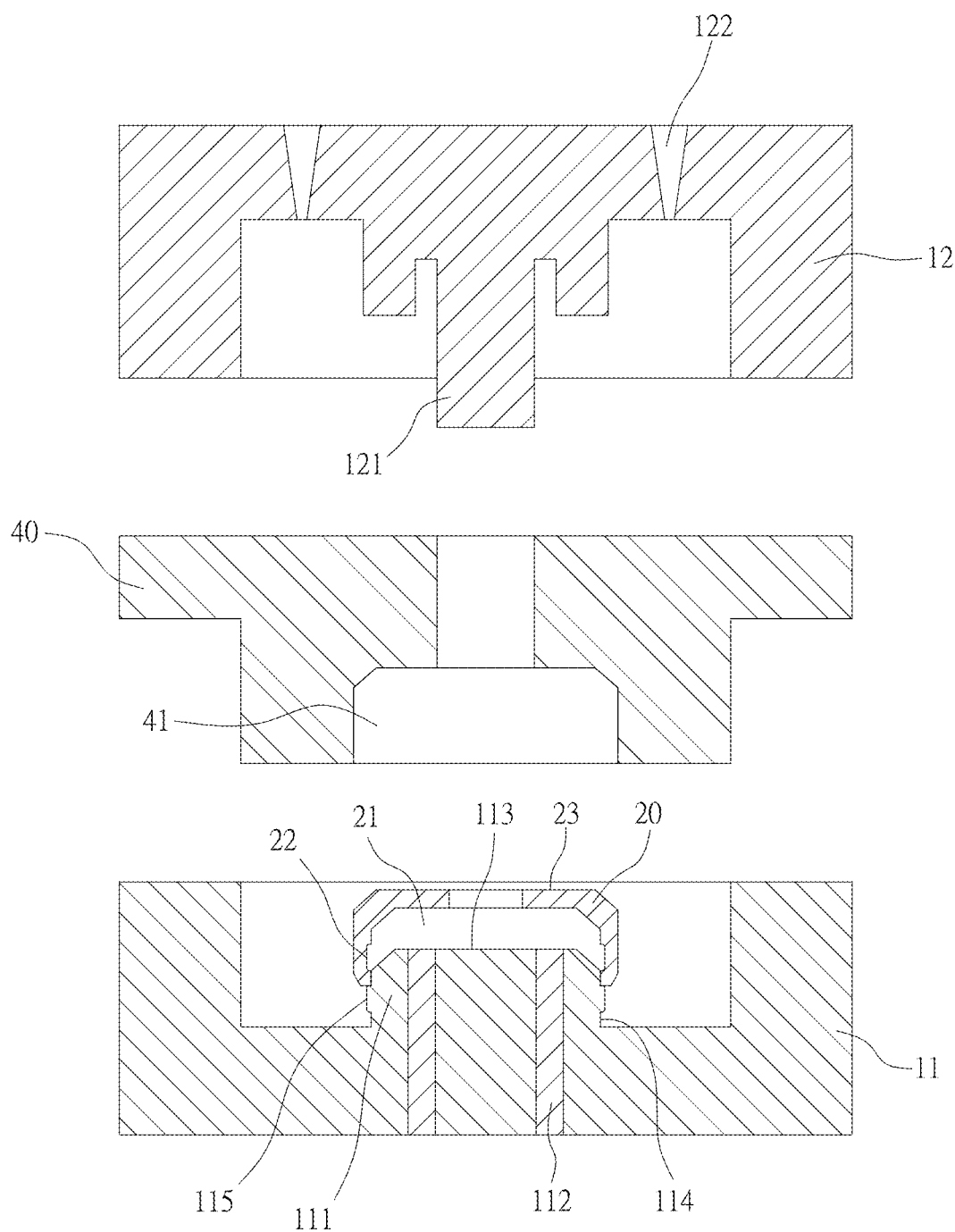
FIG. 3 shows a cutaway view wherein a press-fit jig is put into the mold, according to the present invention.
Figure 4:
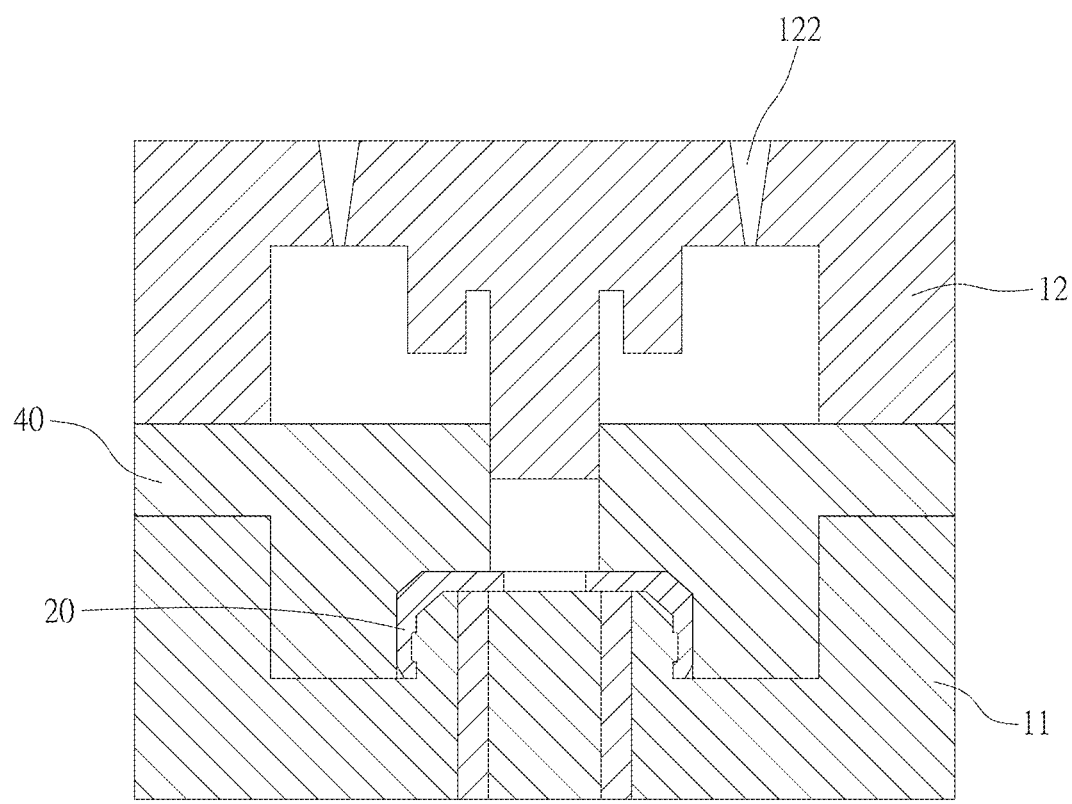
FIG. 4 shows a cutaway view after performing a first joint, according to the present invention.
Figure 5:
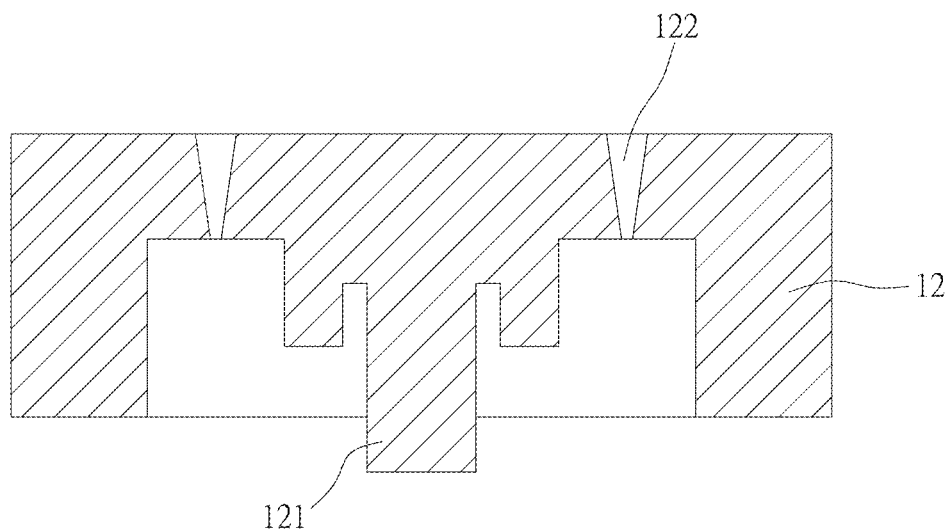
FIG. 5 shows a cutaway view after performing a first open-die, according to the present invention.
Figure 5:
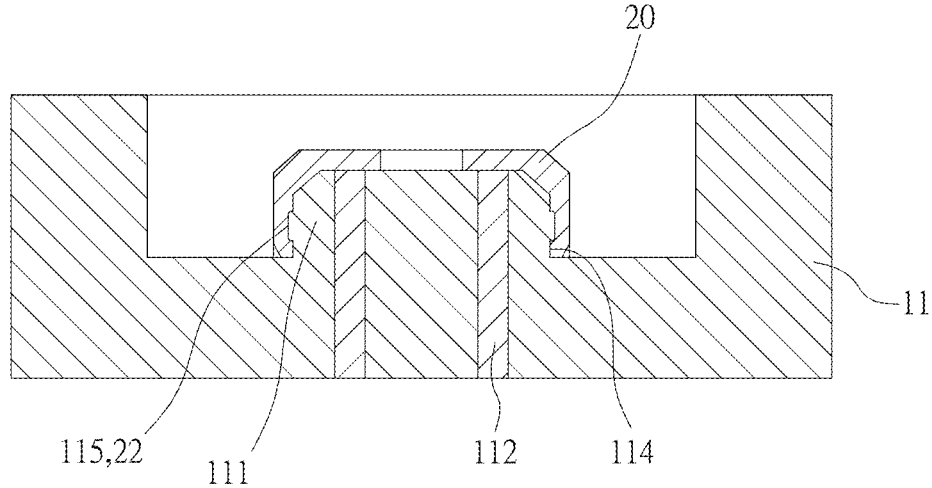
Figure 6:
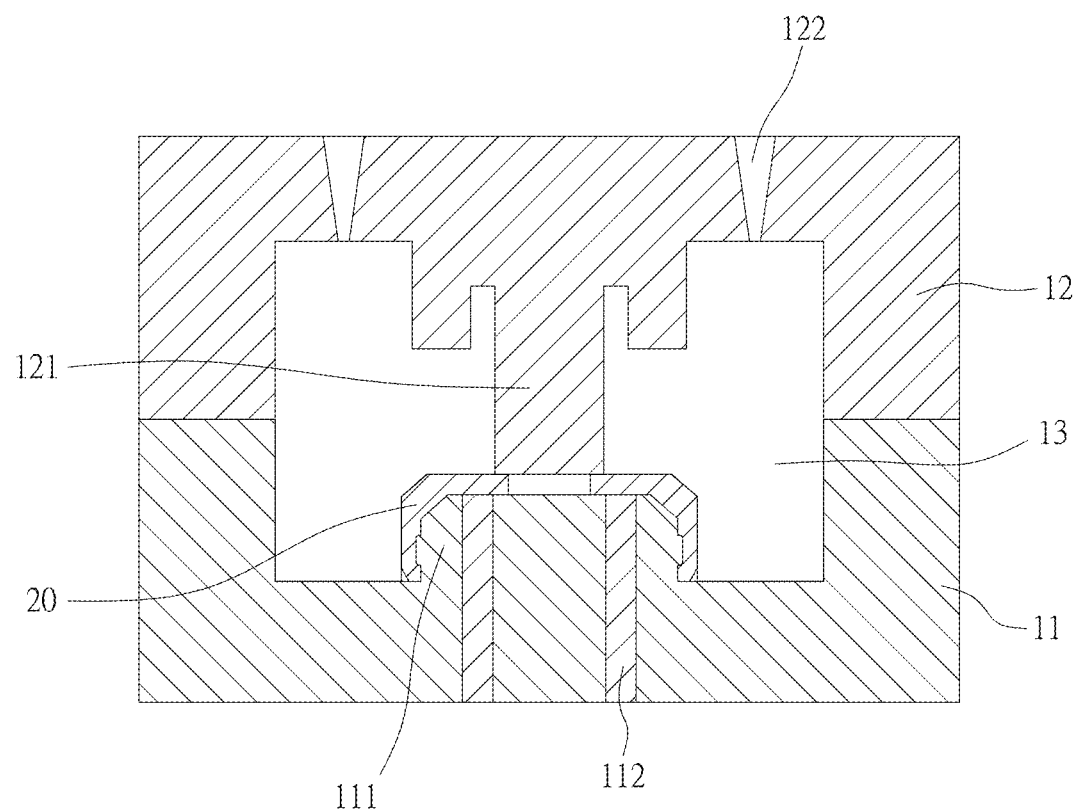
FIG. 6 shows a cutaway view after performing a second joint, according to the present invention.
Figure 7:
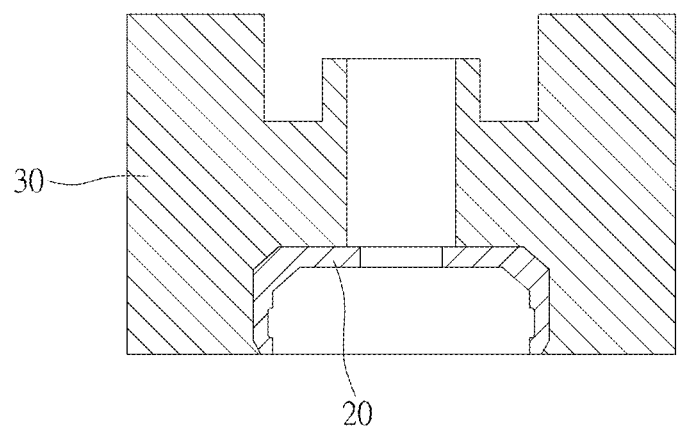
FIG. 7 shows a cutaway view of finished product, according to the present invention.

Referring to FIGS. 1 to 7, the present invention discloses an injection molding method for a semifinished product. The forming method comprises a semifinished product emplacement step S1, a semifinished product pre-compression step S2 and a forming step S3.

In the semifinished product emplacement step S1, a pair of mold 10 is first disposed on an injection machine (as it belongs to an existing technology, no further description is provided). The mold 10 includes a first mold base 11 and a second mold base 12. An interior of the first mold base 11 is provided with a loading member 111 and an ejection mechanism 112. The loading member 111 is used to carry a semifinished product 20 and is provided with a top surface 113 as well as a side wall 114 which surrounds the top surface 113 and is interconnected with the first mold base 11. The side wall 114 is also protruded at least with a latching bump 115. The ejection mechanism 112 is disposed in the loading member 111. An interior of the second mold base 12 is provided with an abutting member 121. After joining the first mold base 11 with the second mold base 12, a forming space 13 is formed in the mold 10, and the second mold base 12 is provided with a flow channel 122 for the flowing of a forming material 30.

In the present embodiment, the semifinished product 20 is made of plastic, and the forming material 30 is made of silica-gel. The semifinished product 20 is emplaced on the loading member 111 of the first mold base 11 by a manipulator (as it belongs to an existing technology, no further description is provided). It is worth mentioning that the semifinished product 20 is provided with a sheathing space 21, so that the semifinished product 20 can be sheathed on the loading member 111. In addition, a latching groove 22 is formed in the sheathing space 21 corresponding to the latching bump 115, so that the latching bump 115 can be latched with the latching groove 22. An outer part of the semifinished product 20 is formed with an outer surface 23. When the semifinished product 20 is sheathed on the loading member 111 through the manipulator, as the latching bump 115 on the loading member 111 is protruded outside the side wall 114, the semifinished product 20 cannot be sheathed outside the loading member 111 completely, and is only sheathed on a front edge of the loading member 111 limited by the latching bump 115.

In the semifinished product pre-compression step S2, a press-fit jig 40 is provided. The press-fit jig 40 is emplaced between the first mold base 11 and the second mold base 12, and is provided with a press-fit space 41 having a same shape as that of the semifinished product 20. After the press-fit jig 40 is emplaced in the first mold base 11 and the second mold base 12, a first joint is performed to the first mold base 11 and the second mold base 12, allowing the press-fit space 41 to be sheathed outside the semifinished product 20 using pre-joint force resulted from the first mold base 11 and the second mold base 12. Next, the press-fit jig 40 drives the semifinished product 20 to move toward a bottom of the first mold base 11, allowing the latching groove 22 to be latched with the latching bump 115, which in turn enables the semifinished product 20 to be sheathed on the loading member 111 completely and results in a tight-fitting effect between the semifinished to product 20 and the loading member 111.

In the forming step S3, a first open-die is performed, which separates the first mold base 11 from the second mold base 12. Next, the press-fit jig 40 is removed, and a second joint is performed to the first mold base 11 and the second mold base 12. After that, the forming material 30 is injected into the forming space 13 through the flow channel 122, allowing the forming material 30 to enclose the semifinished product 20. It is worth mentioning that in the present embodiment, when performing the second joint, the abutting member 121 on the second mold base 12 will be abutted on the outer surface 23 of the semifinished product 20, allowing the semifinished product 20 to be clamped between the abutting member 121 and the loading member 111. In addition, as the semifinished product 20 is tightly fitted with the loading member 111, the forming material 30 can be prevented effectively from spilling between the semifinished product 20 and the loading member 111, after being injected into the forming space 13. After the forming material 30 is cooled down and formed in the forming space 13, a finished product 50, which is formed by enclosing the semifinished product 20 with the forming material 30, can be formed in the forming space 13. Then, a second open-die is performed, in order to separate the first mold base 11 from the second mold base 12. It is worth mentioning that after the first mold base 11 separates from the second mold base 12, the forming material 30 left in the flow channel 122 can be cut off from the finished product 50 in the forming space 13 in advance (as it belongs to an existing technology, no further description is provided); thus, the finished product 50 will be reserved on the first mold base 11. Next, the semifinished product 20 is ejected out of the loading member 111 by the ejection mechanism 112, so that the latching groove 22 can escape from the latching bump 115, and the finished product 50 can be removed from the first mold base 11.

Accordingly, as the semifinished product 20 is tightly fitted with the loading member 111, an inner wall of the sheathing space 21 of the semifinished product 20 will be attached with the top surface 113 and the side wall 114 of the loading member 111. In addition, as the semifinished product 20 is also clamped by the loading member 111 and the abutting member 121, the forming material 30 can be even prevented effectively from flowing between the semifinished product 20 and the loading member 111. As in the present embodiment, the forming material 30 is made of silica-gel, and silica-gel is provided with very good fluidity, this method can prevent effectively from spill or burr on the finished product 50, thereby improving the yield of injection molding and preventing from using a lot of manpower to trim the spill or burr.

Figure 8:
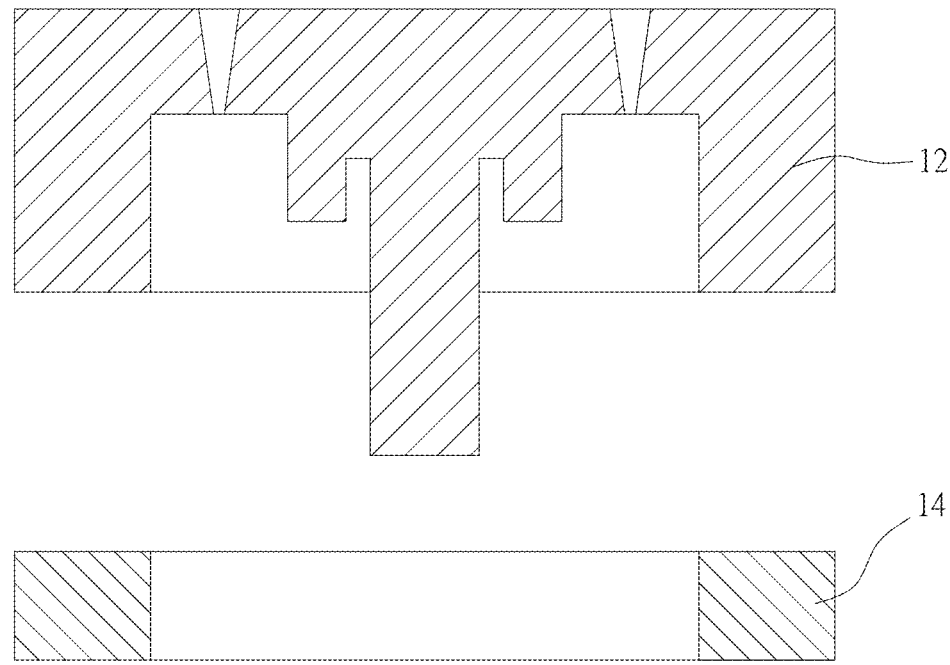
FIG. 8 shows a cutaway view wherein a middle plate is put into the mold, according to the present invention.
Figure 8:
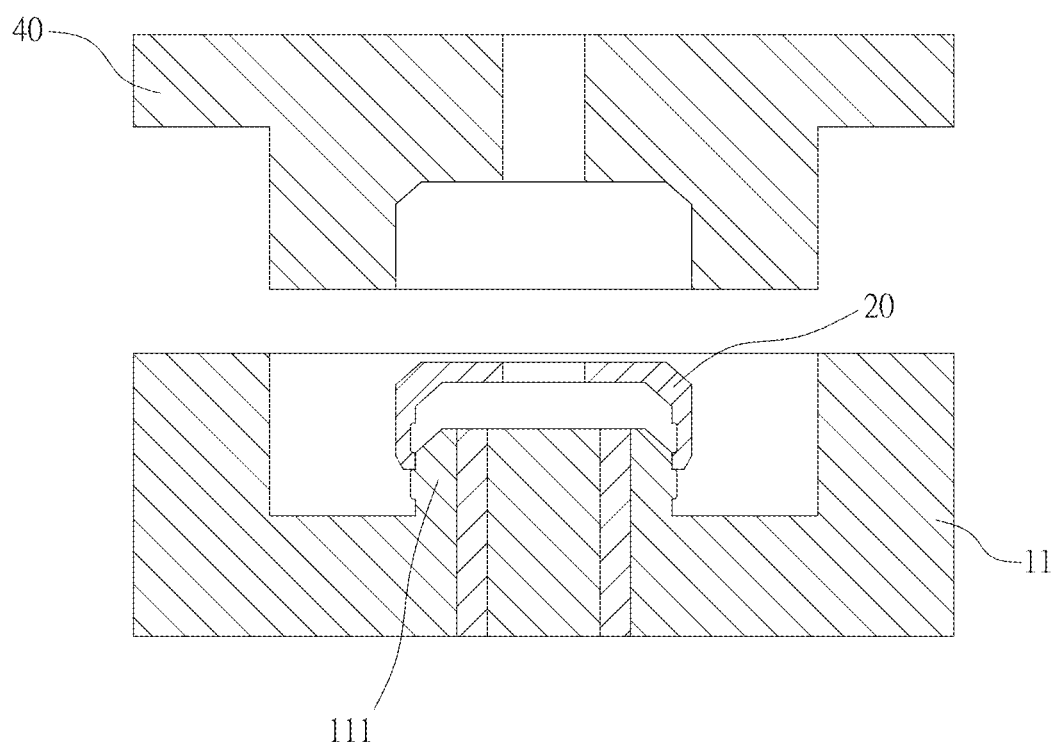
Figure 9:
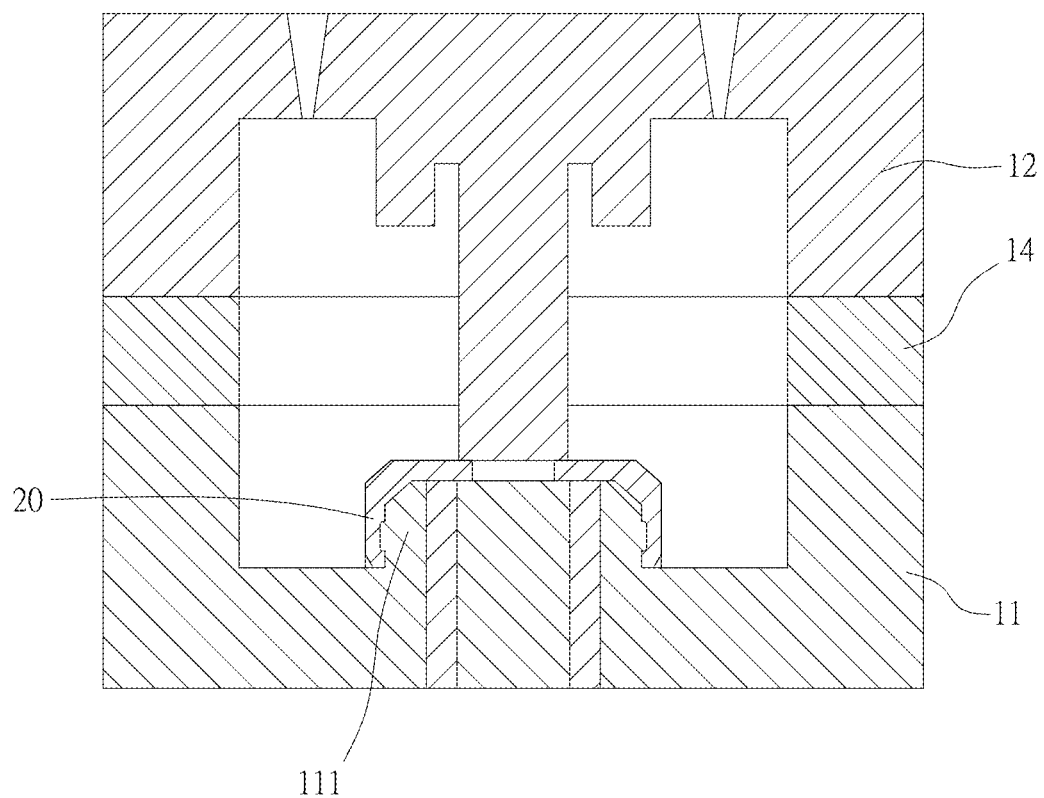
FIG. 9 shows a cutaway view wherein the middle plate is put into the mold for joint, according to the present invention.

Finally, as shown in FIG. 8 and FIG. 9, in the present embodiment, the mold 10 further includes a middle plate 14. The middle plate 14 is disposed primarily between the first mold base 11 and the second mold base 12. When the press-fit jig 40 is put into the mold 10, the press-fit jig 40 is first joined with the first mold base 11 through the middle plate 14, which prevents the shifting of press-fit jig 40 when the first mold base 11 is joined with the second mold base 12, thereby pre-positioning the semifinished product 20, so that the relative position between the semifinished product 20 and the loading member 111 can be secured effectively before performing the first joint to the first mold base 11 and the second mold base 12. Thus, the yield of injection molding can be improved even more.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An injection molding method for a semifinished product, comprising steps of:
    a) a semifinished product emplacement, wherein a pair of mold is provided first, the mold includes a first mold base and a second mold base, a forming space is formed between the first mold base and the second mold base, and a semifinished product is put into the first mold base;
    b) a semifinished product pre-compression, wherein a press-fit jig is provided, the press-fit jig is put between the first mold base and the second mold base to perform a first joint to the first mold base and the second mold base, resulting in pre-joint force between the first mold base and the second mold base to press the semifinished product into the first mold base by the press-fit jig, which forms a tight-fitting relation between the semifinished product and the first mold base; and
    c) a forming, wherein a first open-die is performed to separate the first mold base from the second mold base, the press-fit jig is removed next, and a second joint is performed to the first mold base and the second mold base, next a forming material is injected into the forming space, allowing the forming material to enclose the semifinished product in the forming space, which forms a finished product after the forming material is cooled down and formed in the forming space, followed by performing the second open-die and removing the finished product.

2. The injection molding method for a semifinished product, according to claim 1, wherein the mold includes further a middle plate which is disposed between the first mold base and the second mold base, with that upon performing the first joint, the press-fit jig is disposed between the first mold base and the middle plate.

3. The injection molding method for a semifinished product, according to claim 1, wherein an interior of the first mold base is further formed with a loading member, and the semifinished product is sheathed outside the loading member and is tightly fitted with the loading member.

4. The injection molding method for a semifinished product, according to claim 3, wherein the loading member is provided with a top surface and a side wall which surrounds the top surface and is interconnected with the first mold base, with that the side wall is protruded with a latching bump which is latched with the semifinished product.

5. The injection molding method for a semifinished product, according to claim 4, wherein an interior of the semifinished product is provided with a sheathing space, allowing the semifinished product to be carried on the loading member through the sheathing space, with that a wall of the sheathing space is attached with the top surface and the side wall of the loading member and is tightly fitted with the loading member.

6. The injection molding method for a semifinished product, according to claim 5, wherein a latching groove is disposed in the sheathing space corresponding to the latching bump, and is latched with the latching bump.

7. The injection molding method for a semifinished product, according to claim 3, wherein an interior of the second mold base is further provided with an abutting member which is pressed on an outer surface of the semifinished product.

8. The injection molding method for a semifinished product, according to claim 3, wherein an interior of the first mold base is further provided with an ejection mechanism which is disposed in the loading member, so that the finished product is ejected out of the first mold base by the ejection mechanism.

9. The injection molding method for a semifinished product, according to claim 1, wherein an interior of the second mold base is further provided with a flow channel for the flowing of forming material, and the flow channel is interconnected with the forming space, allowing the forming material to enter into the forming space through the flow channel.

10. The injection molding method for a semifinished product, according to claim 9, wherein the semifinished product is made of plastic, and the forming material is made of silica-gel.

* * * * *